(12) United States Patent
Gregory et al.

(10) Patent No.: US 7,879,926 B2
(45) Date of Patent: Feb. 1, 2011

(54) METHOD AND COMPOSITION FOR CONTROLLING THE VISCOSITY OF LATEX COMPOSITIONS THAT INCLUDE FLY ASH

(75) Inventors: Max Howard Gregory, Cartersville, GA (US); Russ Kendal Majors, San Marcos, TX (US)

(73) Assignee: Boral Material Technologies Inc., San Antonio, TX (US)

( * ) Notice: Subject to any disclaimer, the term of this patent is extended or adjusted under 35 U.S.C. 154(b) by 793 days.

(21) Appl. No.: 11/567,473

(22) Filed: Dec. 6, 2006

(65) Prior Publication Data

US 2008/0139704 A1 Jun. 12, 2008

(51) Int. Cl.
*C08K 3/04* (2006.01)
*C08K 3/38* (2006.01)
*C09D 5/18* (2006.01)

(52) U.S. Cl. .................. 524/60; 524/378; 524/405; 523/179; 106/15.05

(58) Field of Classification Search ............... 524/60, 524/378, 405; 523/179; 106/15.05
See application file for complete search history.

(56) References Cited

U.S. PATENT DOCUMENTS

| | | | | |
|---|---|---|---|---|
| 3,741,913 A | * | 6/1973 | Waag | 510/347 |
| 3,763,068 A | * | 10/1973 | Schuler, Jr. | 523/136 |
| 4,273,821 A | * | 6/1981 | Pedlow | 428/215 |
| 5,082,500 A | * | 1/1992 | Nachtman et al. | 106/162.5 |
| 5,623,013 A | | 4/1997 | Tanaka et al. | |
| 5,830,319 A | * | 11/1998 | Landin | 162/159 |
| 5,851,625 A | | 12/1998 | Smesny et al. | |
| 6,153,668 A | | 11/2000 | Gestner et al. | |
| 6,153,674 A | | 11/2000 | Landin | |
| 6,407,168 B1 | | 6/2002 | Sugita et al. | |
| 6,458,883 B1 | | 10/2002 | Takashima et al. | |
| 6,521,834 B1 | | 2/2003 | Dykhoff et al. | |
| 6,569,924 B2 | | 5/2003 | Shendy et al. | |
| 6,797,386 B2 | | 9/2004 | Yabui et al. | |
| 6,825,280 B1 | | 11/2004 | Hayakawa et al. | |
| 6,855,754 B2 | | 2/2005 | Takamura et al. | |
| 6,875,801 B2 | | 4/2005 | Shendy et al. | |
| 6,964,997 B2 | | 11/2005 | Kikuchi et al. | |
| 7,238,654 B2 | * | 7/2007 | Hodge et al. | 510/199 |
| 2004/0009319 A1 | | 1/2004 | Zanchetta et al. | |
| 2004/0115417 A1 | * | 6/2004 | Fischer et al. | 428/304.4 |
| 2005/0011401 A1 | | 1/2005 | Bauer et al. | |
| 2005/0112320 A1 | | 5/2005 | Wright | |
| 2005/0160944 A1 | * | 7/2005 | Wagh et al. | 106/691 |
| 2005/0215667 A1 | | 9/2005 | Shimaoka et al. | |
| 2005/0281999 A1 | | 12/2005 | Hofmann et al. | |
| 2005/0282960 A1 | | 12/2005 | Chang et al. | |
| 2009/0214853 A1 | * | 8/2009 | Quist et al. | 428/319.1 |

FOREIGN PATENT DOCUMENTS

| | | |
|---|---|---|
| EP | 0 930 320 A1 | 7/1999 |
| WO | WO 91/07473 | 5/1991 |
| ZA | 8404293 A * | 11/1984 |

* cited by examiner

*Primary Examiner*—Tae H Yoon
(74) *Attorney, Agent, or Firm*—McKeon Meunier Carlin Curfman

(57) ABSTRACT

The present invention is a method and composition for controlling the viscosity of latex compositions that include fly ash. The composition is an aqueous dispersion comprising water, at least one polymer latex, from about 50 to about 600 parts by weight fly ash per 100 parts by weight dry polymer, and a viscosity stabilizing composition that preferably comprises at least one borate compound. The method includes adding a viscosity stabilizing composition to an aqueous polymer latex composition that includes fly ash. The viscosity stabilizing composition can be used to produce a stirred viscosity of the aqueous dispersion 7 days after mixing that is less than 30% greater than the viscosity of the aqueous composition immediately after mixing.

24 Claims, No Drawings

METHOD AND COMPOSITION FOR CONTROLLING THE VISCOSITY OF LATEX COMPOSITIONS THAT INCLUDE FLY ASH

BACKGROUND OF THE INVENTION

The present invention relates generally to filled aqueous polymer latices such as those used for carpet backing and roofing, and more particularly relates to surfactants and/or borate compounds used to stabilize the viscosity of aqueous polymer latices that include fly ash or fly ash blends.

Aqueous polymer dispersions or latices consist of small particles of polymers, typically ranging in size from 60 nm to 250 nm, dispersed in water. They are typically produced using emulsion polymerization, and can be used in a wide range of industrial applications, including carpet backing, seal coatings, waterproofing membranes, fabric sizing and reinforcement, automotive components and adhesives. These polymer dispersions often utilize a mineral filler or extender to impart desired mechanical properties and to reduce raw material costs. Exemplary mineral fillers include calcium carbonate, aluminum trihydrate (aluminum hydroxide), kaolin (aluminum silicate dihydrate), talc, mica, wollastonite, silica, glass flakes and glass spheres.

Recently, there has been an increased interest in using fly ash as a filler in aqueous polymer latices. In particular, because fly ash is a recycled material produced by the combustion of coal, fly ash qualifies as a recycled material and thus is desirable for this reason. Furthermore, fly ash has been found to be a particularly useful filler for polymer composites as described, for example, in U.S. Pat. Nos. 6,695,902 and 6,916,863, which are hereby incorporated by references in their entirety.

Conventional latex systems used in the carpet industry as adhesive backing materials are low viscosity, aqueous compositions that are applied at high carpet production rates and preferably offer good fiber-to-backing adhesion, tuft bind strength and adequate flexibility. Generally, excess water is driven off and the latex is cured by passing through a drying oven. Styrene butadiene rubbers (SBR) are the most common polymers used for latex adhesive backing materials. Typically, the latex backing system is heavily filled with an inorganic filler such as calcium carbonate or aluminum trihydrate. The latex systems used in the carpet industry may further include other ingredients such as antioxidants, antimicrobials, flame retardants, smoke suppressants, wetting agents, anti-foaming agents, frothing agents and rheology modifiers.

Practical use of fly ash as a filler in aqueous polymer latices has been limited, however, due to adverse rheological effects in adding fly ash to an aqueous polymer latex. Specifically, adding fly ash to an aqueous latex can result in a significant increase in the viscosity of the latex formulation, to 50,000 centipoise (cP) or more, over time. A significant increase in the viscosity of a formulation can lead to difficulty in storing, processing, or applying the aqueous latex formulation. Specifically, a liquid with a viscosity of more than 30,000-40,000 cP is difficult to pump or otherwise transport into and out of tanks and other processing equipment. As a result the formulation may need to be removed manually, e.g., by shoveling it out of the storage unit. Furthermore, manufacturers using an aqueous polymer latex may have viscosity limits or specifications to ensure product quality (i.e. uniform thickness of application) and thus increases in viscosity caused by the use of a fly ash as a filler would be undesirable.

Because of above discussed limitations in processing or applying aqueous polymer dispersions that have experienced a significant viscosity increase over time, it would be desirable to minimize the rise in the viscosity of an aqueous polymer latex so that it can be stored for one or more days and even over a week and can be processed and/or applied to a substrate as a desirable viscosity.

BRIEF SUMMARY OF THE INVENTION

The present invention overcomes the problems of the prior art by providing a method of stabilizing fly ash or a fly ash blend in an aqueous polymer dispersion to reduce the viscosity increase over time of the polymer dispersion so that it can be stored for several days and subsequently be processed and/or applied to a substrate using normal process transport methods. The present invention also can be used to stabilize aqueous polymer dispersions including other fillers that have been found to cause undesirable increases in viscosity in the polymer dispersion over time.

In particular, the invention includes an aqueous dispersion preferably comprises water, at least one polymer, from about 50 to about 600 parts by weight fly ash per 100 parts by weight dry polymer, and a viscosity stabilizing composition that preferably comprises at least one borate compound. The at least one polymer in the dispersion preferably includes one or more polymers selected from the group consisting of styrene-butadiene polymers, styrene-acrylic polymers, straight acrylic polymers, vinyl acetate acrylate polymers and vinyl acetate-ethylene polymers. The fly ash is preferably present in an amount from about 150 to about 400 parts by weight fly ash per 100 parts by weight dry polymer.

The at least one borate compound is preferably present in the aqueous dispersion in an amount of from about 0.1 to 10 parts by weight, and more preferably about 0.5 to about 3 parts by weight, per 100 parts by weight dry polymer. Preferably, the at least one borate compound is selected from the group consisting of borax and boric acid. Preferably, the weight ratio of at least one borate compound to fly ash is from about 0.002 to about 0.02.

The viscosity stabilizing composition preferably further comprises at least one surfactant. The surfactant preferably includes at least one surfactant selected from the group consisting of alkylphenol polyethoxylates having alkyl groups with 7-18 carbon atoms and 4-100 ethylene oxide units and polyethoxylated fatty alcohols having 12-19 carbon atoms and 4-100 ethylene oxide units. More preferably, the at least one surfactant is selected from the group consisting of alkylphenol polyethoxylates having alkyl groups containing 8-13 carbon atoms and having 20-40 ethylene oxide units and polyethoxylated fatty alcohols having 16-18 carbon atoms and 15-50 ethylene oxide units.

The viscosity stabilizing composition allows the aqueous dispersion to be pumped or otherwise transported into and out of tanks and other processing equipment even after is has been stored for short periods of time, e.g., 7 days. In particular, the stirred viscosity of the aqueous dispersion 7 days after mixing the at least one polymer latex, fly ash, and the viscosity stabilizing composition is preferably less than 30% greater than the viscosity of the aqueous composition immediately after mixing the at least one polymer latex, fly ash, and the viscosity stabilizing composition. In other words, the 7-day viscosity rise is preferably less than 30%. More preferably, the 7-day viscosity rise is less than 20%.

The present invention also includes a method of controlling the viscosity in an aqueous polymer latex dispersion that includes fly ash. An aqueous polymer latex dispersion is provided comprising water and at least one polymer latex. Fly ash is preferably mixed with the dispersion in an amount from about 50 to about 600 parts by weight, more preferably 150 to about 400 parts by weight, fly ash per 100 parts by weight dry polymer. At least one borate compound is also preferably mixed with the polymer latex dispersion. Typically, the borate compound will be added to the dispersion prior to or concurrent with adding the fly ash to the dispersion. In some applications, it may be desirable to mix the fly ash with water to make a slurry which is in turn mixed with the aqueous polymer latex dispersion.

Preferably, the at least one borate compound is added in an amount such that 0.1 to 10 parts by weight, more preferably about 0.5 to about 3 parts by weight of the at least one borate compound is added per 100 parts by weight dry polymer. In addition, the fly ash and the viscosity stabilizing composition are added in an amount such that the weight ratio of at least one borate compound to fly ash is from about 0.002 to about 0.02. The method of the invention can also include the step of mixing at least one surfactant with the aqueous polymer latex dispersion. Preferably, the at least one surfactant is mixed with the aqueous polymer latex dispersion after or concurrent with the step of mixing fly ash with the aqueous polymer latex dispersion.

The present invention further includes a fly-ash filled polymer composition, comprising 100 parts by weight of at least one polymer, from about 50 to about 600 parts by weight fly ash, and from about 0.1 to about 10 parts by weight of at least one borate compound, preferably selected from the group consisting of borax and boric acid. More preferably, the polymer composition comprises from about 150 to about 400 parts fly ash and about 0.5 to about 3 parts of said at least one borate compound. The polymer composition can further include at least one surfactant selected from the group consisting of alkylphenol polyethoxylates having alkyl groups with 7-18 carbon atoms and 4-100 ethylene oxide units and polyethoxylated fatty alcohols having 12-19 carbon atoms and 4-100 ethylene oxide units. Preferably, the polymer composition include from greater than 0 to about 5.0 by weight, more preferably, about 0.3 to about 3.0 parts by weight, of the at least one surfactant per 100 parts by weight dry polymer. The fly-ash filled polymer composition can be, for example, carpet backing.

These and other features and advantages of the present invention will become more readily apparent to those skilled in the art upon consideration of the following detailed description and accompanying drawings, which describe both the preferred and alternative embodiments of the present invention.

DETAILED DESCRIPTION OF THE INVENTION

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. The term "comprising" and variations thereof as used herein is used synonymously with the term "including" and variations thereof and are open, non-limiting terms.

As used herein, the term "viscosity" refers to the viscosity as determined by a Brookfield viscometer. A Brookfield viscometer measures the torque required to rotate a spindle at constant speed in a liquid of a given temperature. As used herein, "peak viscosity" refers to the viscosity as determined during the first rotation of the spindle of a Brookfield viscometer at a spindle speed of 20 rpm and is indicative of the static viscosity of the material when stored. As used herein, the "level viscosity" refers to the viscosity as determined one minute after the spindle of a Brookfield viscometer is turned on at a spindle speed of 20 rpm and is indicative of the viscosity as it begins to move through the system As used herein, "stirred viscosity" refers to the viscosity as determined after the indicator has settled and does not change within a reasonable period during rotation of the spindle of a Brookfield viscometer at a spindle speed of 20 rpm after stirring the mixture using an external stirring device and reflects the actual viscosity once it goes through all process equipment and as applied to a substrate. The procedure for determining viscosity is described in more detail herein.

The present invention is directed to an aqueous polymer dispersion comprising water, at least one polymer, a filler comprising fly ash, and at least one viscosity stabilizing composition.

The aqueous polymer dispersion according to the invention comprises at least one polymer dispersed in water or in aqueous solution. Polymers according to the invention include polymers, copolymers, and oligomers that are dispersible in water or an aqueous solution, such as styrene-butadiene copolymers including acrylonitrile-butadiene-styrene (ABS) copolymers; styrene isoprene copolymers, acrylic or acrylate polymers and copolymers including straight acrylics, styrene-acrylics and ethylene acrylics; vinyl acetate polymers and copolymers including vinyl acetate ethylene (VAE) copolymers and vinyl acetate acrylates; polyacrylonitriles; polystyrenes; polyurethane dispersions; and natural latex. The polymer particles according to the invention preferably range in size from 60 nm to 250 nm.

In one embodiment, the polymers are polymers suitable for use in aqueous carpet-backing dispersions, such as styrene-butadiene copolymers, styrene-acrylic copolymers, polystyrenes, polyacrylonitriles, and vinyl acetate ethylene (VAE) copolymers. Suitable polymers that are commercially available include but are not limited to TR B4843 available from Textile Rubber; GR-SB-1170, Noveon CR-763, and Noveon CR-760 available from Noveon; Rovene 4457 and Rovene 4487 available from Mallard Creek Polymers; LXC-811NA, LXC-8476NA, LXC-803NA, LXC-803F1, LXC-807NA and XU-31491.02 available from Dow Chemical; NS6690X latex from BASF; DRSL Tylac 99823 and DRSL Tylac 68968 available from Dow Reichhold Specialty Latex; Elvace 722, Elvace 758 and SP-490 available from Forbo; DS-SBX from Celanese and PC-218 styrene/butadiene vinylpyridine available from Polycom Industries, LLC.

In one embodiment, the polymer is an aqueous dispersed polymer suitable for roof coatings, roof tiles, and/or roofing membranes. In this embodiment, the polymer is preferably acrylic-based, e.g., acrylics, acrylates, styrene acrylics, and ethylene acrylics. An example of an aqueous dispersed polymer suitable for roof coatings is Rhoplex® EC-1791, an acrylic latex available from Rohm & Haas.

The aqueous polymer dispersions can optionally include surfactants and other additives. Suitable additives include blowing agents, flame retardants, pigments, antistatic agents, anti-foaming agents, frothing agents, reinforcing fibers (e.g. glass fibers), antioxidants, preservatives, biocides, water scavengers, acid scavengers, and the like.

The composition of the invention also includes at least one filler. Preferably, the filler includes fly ash or a fly ash blend. Fly ash is produced from the combustion of pulverized coal in electrical power generation plants. Fly ash is formed of mineral matter that is typically of very fine particle size, ranging from less than 1 micron to over 100 microns in some cases. The chemical composition of fly ash changes as a result of the type of coal being burned in the boiler. These differences are largely in the relative proportions of the element calcium present in the ash. For example, high rank bituminous coals generally have a low calcium content and produce an ash with relatively low calcium, typically less than 5% as CaO; whereas low rank thermal coals generally have much higher content of calcium, typically in the range 8-20% CaO for lignite coals and 20-30% CaO, or higher, for subbituminous coals. These differences are recognized by ASTM specifications, such as ASTM C-618 that governs the use of fly ash as a pozzolan in concrete in the United States and elsewhere, and by Canadian specifications that classify the ashes based on their CaO content.

Current ASTM C-618 specifications include only two designations or classes of fly ash: "Class F" and "Class C" fly ashes. The "Class F" designation generally incorporates fly ashes originating from the combustion of bituminous and lignite coals and the "Class C" designation generally incorporates ashes from the combustion of subbituminous coals. These designations are based on the chemical composition of the fly ash in such a way that when the sum of the element oxides ($SiO_2+Al_2O_3+Fe_2O_3$) derived from chemical analysis of the ash is equal to or greater than 70% by weight, then the fly ash is designated a "Class F" fly ash. When the sum of the element oxides is equal to or greater than 50% by weight, the fly ash is designated as a "Class C" fly ash.

In Canada, as mentioned above, fly ashes have certain designations based on their CaO content. In particular, a fly ash is considered a "Class F" when it includes less than 8% CaO, a "Class CI" when it includes 8-20% CaO, and a "Class CH" when it includes greater than 20% CaO.

The filler used according to the invention can include fly ash such as a lignite fly ash, subbituminous ash, bituminous ash, or a blend of two or more fly ashes (e.g. subbituminous/bituminous, bituminous/lignite, lignite/subbituminous, and bituminous/lignite/subbituminous blends). In addition, two or more fly ashes from the same type of coal source, e.g., two different lignite coal fly ashes, can be blended to produce the filler blend of the invention. In the filler blends, the first fly ash can be included in an amount from about 0.1% to about 99.9%, more preferably from about 10% to about 90% by weight of the filler blend and the second fly ash can be included in an amount from about 99.9% to about 0.1%, more preferably from about 90% to about 10% by weight of the filler blend. The filler blend typically has a carbon content of from about 0.1% to about 15% by weight and can advantageously be selected to have a carbon content of from about 1% to about 5% by weight as discussed above. Although a fly ash filler blend can be produced by blending two different fly ashes, a fly ash filler blend can also be formed by burning at least two different coals selected from the group consisting of bituminous coals, lignite coals and subbituminous coals, and using the resulting ash as the filler blend. For example, a subbituminous coal and a bituminous coal can be burned together to produce a filler blend.

In addition, the fly ash can be a Class C fly ash, a Class F fly ash, or a blend thereof. More preferably, the filler is a lignite/subbituminous blend of Class F fly ash. One preferred fly ash is PV14A fly ash, available from Boral Material Technologies, Inc.

The fly ash filler typically has a carbon content of from about 0.1% to about 15% by weight and can advantageously be selected to have a carbon content of from about 1% to about 5% by weight. Carbon content in the fly ash of greater than 5% may result in high viscosities when mixed with the polymer. Although fly ash having a carbon content less than 1% can advantageously be used with the invention, a carbon content of 1% or greater can, in some applications, result in a polymer composite having improved mechanical properties.

In one embodiment of the invention, the filler blend can include a first fly ash and a second fly ash. For example, the filler blend can include a high fine particle content fly ash filler such as a subbituminous coal fly ash (e.g. having a median particle size of 10 microns or less) and a low fine particle content fly ash filler such as a bituminous coal fly ash (e.g. having a median particle size of 20 microns or greater). In addition, other blends of fly ashes are possible such as bituminous/lignite, lignite/subbituminous and bituminous/lignite/subbituminous blends.

Coupling agents can be used with the fly ash fillers of the invention for use with certain polymers. Suitable coupling agents include, for example, silanes, titanates, zirconates and organic acids.

In one embodiment of the invention, one or more additional fillers can be used in addition to fly ash. Suitable fillers include calcium carbonate, aluminum trihydrate (ATH), ground glass, milled glass, glass spheres, glass flakes, silica, silica fume, slate dust, amorphous carbon (e.g. carbon black), clays (e.g. kaolin), mica, talc, wollastonite, alumina, feldspar, bentonite, quartz, garnet, saponite, beidellite, calcium oxide, calcium hydroxide, antimony trioxide, barium sulfate, magnesium oxide, titanium dioxide, zinc carbonate, zinc oxide, nepheline syenite, perlite, diatomite, pyrophillite and the like, or blends thereof. For example, the filler used in the polymer dispersion can be a blend of calcium carbonate and a high fine particle content fly ash filler such as a lignite or subbituminous fly ash (e.g. having a median particle size of 10 microns or less). The filler blend can include from about 0.1% to about 99.9%, more preferably about 10% to about 90% by weight of the fly ash and from about 99.9% to about 0.1%, more preferably about 90% to about 10% by weight of the at least one additional filler. Preferably, the filler blend includes at least 50% by weight fly ash. The fly ash can also be selected to produce a filler blend having a carbon content of from 1% to 5% by weight as discussed above or a primarily carbon-containing material (such as an amorphous carbon) can be added to the filler blend.

The fly ash is typically present in the aqueous dispersion in an amount of from about 50 to about 600 parts by weight per 100 parts by weight dry polymer. More preferably, the fly ash is present in an amount from about 150 to about 400 parts by weight or even 200 to about 350 parts by weight per 100 parts by weight dry polymer. The aqueous dispersion can optionally include additional fillers as discussed above in an amount of from greater than 0 to 600 parts by weight, more preferably from 50 to 250 parts by weight.

The viscosity stabilizing composition of the invention can be used not only with fly ash filler but also with other fillers that are known to cause undesirable increases in aqueous latex dispersions in storage, particularly with fillers that have an undesirable effect on the pH of the dispersion. In particular, it has been found that glass fillers (e.g. ground glass, milled glass, glass spheres, and glass flakes) can cause undesirable increases in stored latex dispersions when used as a filler. Accordingly, in one embodiment of the invention, a filler is present in the aqueous dispersion in an amount of from about 50 to about 600 parts by weight per 100 parts by weight dry polymer, wherein the filler is selected from the group consisting of fly ash, glass, and mixtures thereof. More preferably, the fly ash or glass filler is present in an amount from about 150 to about 400 parts by weight or even 200 to about 350 parts by weight per 100 parts by weight dry polymer.

The aqueous polymer dispersion according to the invention also comprises a viscosity stabilizing composition. The viscosity stabilizing composition is provided in an amount sufficient to stabilize the viscosity and preferably the pH of the filled aqueous dispersion over at least a 7 day period.

In a preferred embodiment, the viscosity stabilizing composition includes at least one borate compound. Preferably, the at least one borate compound includes one or more borate salt selected from the group consisting of borax (sodium borate), boric acid, potassium borate, ammonium borate and zinc borate. The borate salts can be provided in anhydrous or hydrated forms, although they are preferably hydrated. Borax is typically available as disodium tetraborate and is commercially available as a decahydrate ($Na_2B_4O_7.10H_2O$), pentahydrate ($Na_2B_4O_7.5H_2O$), or in anhydrous ($Na_2B_4O_7$) form. Nevertheless, the borax can be available in other forms (e.g. sodium metaborate). The boric acid is preferably present in hydrated form but can be provided as anhydrous boric acid ($B_2O_3$). Borate compounds are commercially available from manufacturers such as Rio Tinto Borax and other chemical suppliers.

The at least one borate compound is included in the aqueous dispersion in an amount effective for stabilizing the viscosity and preferably also the pH of the filled aqueous dispersion over at least a 7 day period. Preferably, the at least one borate compound is added to the aqueous polymer dispersion in an amount of from about 0.1 parts by weight to about 10 parts by weight borate compound per 100 parts by weight dry polymer. More preferably, the borate composition is added to the aqueous polymer dispersion in an amount of from about 0.3 to about 5 parts by weight borate compound per 100 parts by weight dry polymer. Most preferably, the borate composition is added in an amount from about 0.5 parts by weight to about 3 parts by weight borate compound per 100 parts by weight dry polymer.

In one embodiment of the invention, the weight ratio of the at least one borate compound to the fly ash is from about 0.001 to about 0.2. Preferably, the weight ratio of the at least one borate compound to the fly ash is from about 0.002 to about 0.02. More preferably, the weight ratio of the at least one borate compound to the fly ash is from about 0.0025 to about 0.008.

The viscosity stabilizing composition can include one or more surfactants. If a surfactant is included, the at least one borate compound and the at least one surfactant are typically present in an amount sufficient to stabilize the viscosity and preferably also the pH of the filled aqueous dispersion over at least a 7 day period. The surfactant used in the viscosity stabilizing composition is preferably not the surfactant used in the polymerization reaction to produce the polymer latex.

In accordance with a preferred embodiment of the invention, the at least one surfactant can include ethoxylated alcohols, preferably alkylphenol polyethoxylates having alkyl groups with 7-18 carbon atoms and 4-100 ethylene oxide units and polyethoxylated fatty alcohols having 12-19 carbon atoms and 4-100 ethylene oxide units. More preferably, the at least one surfactant includes one or more alkylphenol polyethoxylates having alkyl groups containing 8-13 carbon atoms and having 20-40 ethylene oxide units or one or more polyethoxylated fatty alcohols having 16-18 carbon atoms and 15-50 ethylene oxide units. Exemplary surfactants include octylphenol and nonylphenol ethoxylates sold under the IGEPAL® trademark by GAF such as nonylphenol 30-mole ethoxylate (commercially available as IGEPAL® CO-887) and octylphenol 9-mole ethoxylate (commercially available as IGEPAL® CO-630); nonylphenol 30-mole ethoxylate (commercially available as SYSTEM™ 307 from Phoenix Chemical); octylphenol ethoxylates sold under the TRITON® trademark by Dow Chemical Company such as octylphenol 35-mole ethoxylate (commercially available as TRITON® X-405); oleyl alcohol 20-mole ethoxylate (commercially available as TRYCOL® 5971); and CHEMTEX™ 2017.

In addition to the ethoxylated alcohols and ethoxylated alkyl ethers described in the previous paragraph, one or more additional surfactants can be included in the aqueous dispersion as would be understood by those skilled in the art to improve certain properties of the dispersion. For example, sodium hexametaphosphate, tetrasodium pyrophosphate and tetrapotassium pyrophosphate could be used, as could DOWFAX 2A1 available from Dow Chemical Company (an alkyldiphenyloxide disulfonate surfactant), A-10 and A-10S available from ChemTex (alkylbenzene sulfonic acid or sulfonate surfactants), AVELON IS available from Phoenix Chemical (a sodium salt of polynapthalene sulfonic acid), ALCOSPERSE 149 (sodium polyacrylate surfactant), STANSPERSE® 440 (polyelectrolyte surfactant), and TAMOL® 731 (polyelectrolyte surfactant).

The amount of surfactant when included in the viscosity stabilizing composition is preferably from greater than 0 parts to about 5 parts by weight per 100 parts by weight dry polymer, more preferably from about 0.1 parts by weight to about 4 parts by weight per 100 parts by weight dry polymer, most preferably from about 0.3 parts by weight to about 3 parts by weight per 100 parts by weight dry polymer. The surfactants are present in the viscosity stabilizing composition in an amount from 0.5 to 75% by weight, more preferably 5 to 60%, and most preferably 10% to 50% by weight. The weight ratio of the one or more surfactants to the at least one borate compound is typically 0.1:1 to 6:1, more preferably 0.2:1 to 4:1 and most preferably 0.5:1 to 1.5:1. In some embodiments, it may be desirable for the surfactant to be included in the viscosity stabilizing composition only in an amount sufficient to provide the desired viscosity stabilizing effects to minimize any deleterious effects on the strength and binding properties of the dried polymer.

The viscosity stabilizing composition can include a combination of one or more borate compounds and one or more surfactants. For example, in one embodiment, the viscosity stabilizing composition comprises a combination of borax and boric acid. In another embodiment, the viscosity stabilizing composition comprises borax and a nonionic alkylphenol ethoxylate surfactant. In another embodiment, the viscosity stabilizing composition comprises borax and two different nonionic alkylphenol ethoxylate surfactants. In another embodiment, the viscosity stabilizing composition comprises boric acid and two different nonionic alkylphenol ethoxylate surfactants. In yet another embodiment, the viscosity stabilizing composition comprises borax, boric acid, and two different nonionic alkylphenol ethoxylate surfactants. Additional combinations of borates and surfactants can be utilized to optimize the viscosity stabilizing effects with respect to the specific polymers and surfactants already present in the aqueous polymer dispersion.

Additional chemicals can be added to the aqueous polymer dispersions to impart or modify desired properties to the dispersion. Such additives include thickeners, catalysts, dispersants, colorants, froth aids, biocides, anti-foaming agents, fire retardants, anti-static agents, and other additives as are known in the art. For example, thickeners are typically added to the aqueous polymer dispersion after the fly ash and viscosity stabilizing composition have been added to achieve a desired viscosity and coating characteristics for the dispersion. Common thickeners used in the manufacture of carpet backing include sodium polyacrylates, such as products sold under the PARAGUM trademark by Para-Chem such as PARAGUM® 241, 277 and 500; Dural P1113; Alco L-29, Alco ARM, and Alco HPT from Alco Chemical; ChemTex 102 and ChemTex 104 from ChemTex; and Southern Chemical KA-78.

Frothing agents can also be used in the aqueous polymer dispersion and are typically introduced by mechanical introduction of a gas into a liquid to form a froth (mechanical frothing). Mechanical frothing of a polymer is a procedure known and practice by those skilled in the art of preparing polymer dispersions. In preparing a frothed polymer foam for a carpet backing, it is not necessary to obtain a froth that is stable. In a carpet backing production process, a frothed foam typically is spread on the back of a carpet using a spreading tool, which destroys the froth in the process.

As discussed herein, one issue with the use of fly ash as a filler for aqueous latex dispersions is that the viscosity of the fly ash-filled dispersion increases during storage. The present invention provides a method of controlling the viscosity in an aqueous polymer latex dispersion that includes fly ash using a viscosity stabilizing composition so the aqueous dispersion can be pumped or otherwise transported into and out of tanks and other processing equipment even after is has been stored for short periods of time, e.g., 7 days. In accordance with the invention, the viscosity stabilizing composition, and particularly the at least one borate compound and optionally the at least one surfactant are provided in an amount sufficient to stabilize the viscosity and preferably also the pH of the filled aqueous dispersion over at least a 7 day period. Preferably, the stirred viscosity of the aqueous dispersion 7 days after mixing the at least one polymer latex, fly ash, and the viscosity stabilizing composition is preferably less than 30% greater than the viscosity of the aqueous composition immediately after mixing the at least one polymer latex, fly ash, and the viscosity stabilizing composition. In other words, the 7-day viscosity rise is preferably less than 30%. More preferably, the 7-day viscosity rise is less than 20%. The viscosity is measured after addition of the main components being included in the aqueous dispersion prior to storage and after 7 days of storage. In other words, it is measured after the at least one polymer, fly ash (and/or other filler), at least one borate compound, and the optional at least one surfactant are combined and after the viscosity is at the desired level for storage (e.g. after any thickeners are added to produce a desired viscosity).

The fly-ash filled aqueous polymer dispersion is typically prepared by first providing an aqueous polymer latex dispersion comprising water and at least one polymer. Typically, the at least one borate compound is then added to the dispersion prior to or concurrent with the addition of the fly ash (or glass) so as to limit the negative effect the fly ash will have on the viscosity of the dispersion once it is added. The fly ash and other fillers will typically be added at that point. In one embodiment, the fly ash can be combined with water to form a slurry and then added to the dispersion. In a preferred embodiment where the dispersion also includes at least one surfactant, the surfactant is can be added prior to, concurrent with, or after the addition of the fly ash. Preferably, it is added after the fly ash has been added although a portion of the surfactant can be added prior to adding the fly ash. Although the present invention refers to the use of a "viscosity stabilizing composition" it is noted that for purposes of this application that this term is used to describe the components that aid in stabilizing the filled dispersion and that the at least one borate compound and the at least one surfactant can be added and are preferably added at different times. Typically, the at least one borate compound is added before the at least one surfactant. Nevertheless, the at least one borate compound and the at least one surfactant can be added as a mixed composition to the dispersion and, in this embodiment, would typically be added prior to addition of the fly ash.

The resultant fly-ash filled aqueous polymer dispersion is typically applied to a surface and allowed to dry to remove water from the dispersion. For example, if the dispersion is to be used to form carpet backing, the carpet can be heated either prior to or immediately after the latex is applied to facilitate drying of the aqueous dispersion. The dispersion can also be dried by other means as would be understood by those skilled in the art.

After the polymer composition is heated to remove water, the resultant fly-ash filled polymer composition comprises 100 parts by weight of at least one polymer, from about 50 to about 600 parts by weight fly ash, typically from about 0.1 to about 10 parts by weight of at least one borate compound, and optionally from greater than 0 to about 5 parts by weight of at least one surfactant.

The fly-ash filled polymer composition can be used in various applications known for use with polymer latex dispersions. For example, carpet backing, roof coatings, roof tiles, roofing membranes, automotive fabrics, and component coating.

In one embodiment of the invention, the fly-ash filled polymer can be used in carpet backing. For example, the fly ash polymer backing can be used in the primary backing for tufted carpet. For tufted carpet, the yarn is tufted or needled into a primary backing which is generally non-woven polypropylene, polyethylene or polyester or woven jute or polypropylene. The dispersion of the invention can be applied to the yarn of the primary backing to enhance the properties of the primary carpet backing.

In other embodiments, the fly ash polymer backing can be used a secondary backing adhesive for adhering a secondary backing to a primary backing for tufted carpet. The secondary backing is generally formed of woven or non-woven materials similar to those used as the primary backing and applied directly to the wet pre-coated primary backing prior to the drying step or applied with a secondary backing adhesive to the dried pre-coated primary backing. The secondary backing also can be in the form of a foam polymer or copolymer. Suitable foam compositions include urethane polymers, polymers and copolymers of ethylene, propylene, isobutylene and vinyl chloride. When a foam secondary backing is used, it may be prefoamed and then laminated onto the primary backing using a secondary backing adhesive, or the composition may contain a thermally activatable blowing agent and may be foamed immediately prior to lamination or after lamination.

In forming a non-tufted carpet, the aqueous dispersion of the invention can be provided at a viscosity of about 25,000 to 75,000 cP and applied to a scrim surface as a wet coating. The fibers then are directly embedded into the wet coating using conventional techniques and then dried.

A coating based on the aqueous dispersion of the invention is easier to apply to the carpet than hot melt thermoplastic adhesives which require expensive and complex machines and processes to apply the coating, and the coating also penetrates the fibers of the carpet yarns to yield better adhesion, fiber bundle integrity and anti-fuzzing properties. Additionally, the coating exhibits particularly excellent tuft-bind properties. The term "tuft-bind" refers to the ability of the carpet coating to lock and secure the pile yarn tufts to the primary backing and is determined as set forth herein below. Additionally for the purposes herein, tuft-bind is also used to include the superior characteristics needed in non-tufted coatings wherein the adhesion of the fiber pile is achieved solely by the backing. Suitable tuft-bind properties can be achieved by applying an amount of coating ranging from about 10 ounces per square yard to about 40 ounces per square yard (dry basis), which results in a carpet having a tuft-bind value of at least 10 pounds force, and in many instances a tuft-bind value of 15 pounds force or greater.

The present invention will now be further demonstrated by the following non-limiting examples.

EXAMPLES

For the examples, provided herein, the aqueous dispersion was prepared by the following procedure:
1. The liquid latex was weighed and the equivalent to 100 parts of dry polymer by weight was determined.
2. The latex was stirred with an impeller mixer and water was added to adjust the total solids to a predetermined level.
3. The borate compound was weighed and the proper amount was added slowly to the latex.
4. Once the borate compound was dissolved, the filler was weighed and added to the mixture at a rate such that it did not pack on top of the mixture. The agitation was adjusted as needed to dissolve the filler into the mix at a constant rate.
5. The mixture was agitated until all the filler was dispersed and no lumps could be seen.
6. The viscosity and pH of the mixture was measured.
7. The surfactants and any froth aids or other chemicals were then added to the dispersion.
8. The viscosity and pH of the mixture was again measured to determine the starting point for thickening.
9. The thickener was added until the viscosity reached a predetermined level.
10. The viscosity, pH and temperature of the sample was then measured.
11. The container was sealed for future testing.

The viscosity measurements were taken using a laboratory procedure designed to predict the viscosity stability and effect on rheology of latex compounds that have been mixed and then stored prior to use. This procedure is designed to predict whether that change will be significant and how the latex compound will perform at point of application.

The test uses a Brookfield RVT or RVF viscometer to assess the viscosity of latex compounds that must be stored for some time after initial mixing. The viscosity is checked at 20 rpm. A Lightnin Labmaster Mixer was used as the mixer. Any suitable timing device can also be used. The samples were generated by mixing latex, fillers and additives to a predetermined Percent Non-Volatiles (% Total Solids) and Viscosity. The samples were retained in sealed containers for the proper amount of time prior to testing.

The test procedure is set forth below:

Test Procedure

1. The cover was removed from the sample taking care to disturb the liquid material as little as possible.
2. The Brookfield Viscometer was turned on and allowed to turn until the middle of the scale was near the middle of the view window and then turned off.
3. The appropriate viscometer spindle based on the viscosity of the material being tested was carefully introduced into the liquid latex mix and attached to the viscometer. The spindle was introduced as near the outside edge of the material as possible.
4. The sample was carefully adjusted to the prescribed depth and moved until the spindle was near the center of the sample container.
5. The viscometer was again turned on and the timing device was started with the viscometer.
6. A reading was taken when the indicator was at its highest point. This usually occurred during the first revolution. This reading was the "peak viscosity" and simulated the static viscosity of the material when stored.
7. After one (1) minute a second viscosity reading was taken. This reading was the "level viscosity" and is indicative of the viscosity as it begins to move through the system.
8. The sample was removed from the viscometer and placed under agitation using a mixer such that maximum shearing was applied without pulling a vortex and entrapping air into the compound.
9. After a minimum of three (3) minutes agitation, the sample was returned to the viscometer and another reading taken. This reading shows how the material will respond when sheared by pumping, blending or frothing.
10. The readings were recorded and compared to the original mix viscosity to determine whether the compound viscosity was stable enough for normal processing.

The following compounds were used in the examples (amounts are provided in parts per weight dry polymer):
1. FOUNDATIONS™ styrene-acrylic latex (Dow Chemical Company)
2. ROVENE® 4457 carboxylated styrene-butadiane latex (Mallard Creek Polymers)
3. LXC803F1 styrene-butadiene latex (Dow Chemical Company)
4. PARAGUM® 241, 277, 500 and T-111 sodium polyacrylate thickeners (Parachem).
5. CHEMTEX™ 2017 tridecyl alcohol 20-mole ethoxylate surfactant (ChemTex)
6. SYSTEM 307 mixed ethoxylated alcohol mixture (Phoenix Chemical)
7. TRITON X-405 Octylphenoxypolyethyleneoxyethanol nonionic surfactant (Dow Chemical Company)
8. CHEMTEX A-10S alkylbenzenesulfonic acid surfactant (ChemTex)
9. AVELON IS sodium salt of polynapthalene sulfonic acid (surfactant from Phoenix Chemical).
10. BOSTEX 24 hindered phenol antioxidant (Akron Dispersions)
11. CALGON sodium hexametaphosphate water softener (Calgon Corp.) diluted with water to 20-40% concentration and pH adjusted with aqua ammonia to 9.5-10.5.
12. BIOTERGE AS-40 sodium C14-16 olefin sulphonate frothing agent (Univar)
13. DURAL P1113 thickener (Dural)

TABLE 1

Styrene-Acrylic Polymers

| | EXAMPLE | | | | |
|---|---|---|---|---|---|
| | 1 | 2 | 3 | 4 | 5 |
| FOUNDATIONS ™ polymer | 100 | 100 | 100 | 100 | 100 |
| Boric Acid (OPTIBOR) | 3 | 2 | 1.5 | 1 | 0 |
| Borax | 0 | 1 | 1.5 | 2 | 3 |
| Class F Fly ash | 250 | 250 | 250 | 250 | 250 |
| Calcium carbonate | 0 | 0 | 0 | 0 | 0 |
| PARAGUM 500 | 0.45 | 0.45 | 0.45 | 0.45 | 0.45 |
| PARAGUM T-111 | 0.195 | 0.195 | 0.165 | 0.065 | 0.065 |
| Viscosity after mixing (cP) | 9,000 | 9,800 | 10,000 | 9,500 | 9,600 |
| pH after mixing | 7.9 | 8.26 | 8.42 | 8.61 | 9.06 |
| Temperature after mixing (F.) | 84 | 84 | 87 | 75 | 82 |
| Total solids (%) | 79.79 | 79.79 | 79.83 | 79.94 | 79.94 |
| Peak viscosity after 1 day (cP) | 14,000 | 14,000 | 15,000 | 13,750 | 15,000 |
| Level viscosity after 1 day (cP) | 11,750 | 13,250 | 14,250 | 13,250 | 13,500 |
| Stirred viscosity after 1 day (cP) | 10,750 | 11,250 | 12,000 | 12,750 | 13,500 |
| pH after 1 day | 8.12 | 8.4 | 8.53 | 8.73 | 9.08 |
| Peak viscosity after 4 days (cP) | 16,500 | 15,550 | 16,250 | 18,000 | 17,500 |
| Level viscosity after 4 days (cP) | 15750 | 15000 | 16000 | 17500 | 16750 |
| Stirred viscosity after 4 days (cP) | 13500 | 13500 | 14250 | 15250 | 14750 |
| pH after 4 days | 8.09 | 8.48 | 8.63 | 8.78 | 9.18 |
| Peak viscosity after 7 days (cP) | 15500 | 15000 | 16000 | 17500 | 17500 |
| Level viscosity after 7 days (cP) | 14500 | 14250 | 15500 | 16750 | 17000 |
| Stirred viscosity after 7 days (cP) | 13500 | 13500 | 15000 | 16000 | 15750 |
| pH after 7 days | 8.24 | 8.55 | 8.67 | 8.78 | 9.12 |

TABLE 2

More Styrene-Acrylic Polymers

| | EXAMPLE | | |
|---|---|---|---|
| | 6 | 7 | CE1 |
| FOUNDATIONS ™ polymer | 100 | 100 | 100 |
| Boric Acid (OPTIBOR) | 0 | 1 | 0 |
| Borax | 1 | 0 | 0 |
| Class F Fly ash | 250 | 250 | 0 |
| Calcium carbonate | 0 | 0 | 250 |
| PARAGUM 500 | 0.6 | 0.6 | 0.3 |
| PARAGUM T-111 | 0 | 0 | 0 |
| Viscosity after mixing (cP) | 20,750 | 20,750 | 24,000 |
| pH after mixing | 9.11 | 8.69 | 8.14 |
| Temperature after mixing (F) | 87 | 85 | 82 |
| Total solids (%) | 80.15 | 80.15 | 80.15 |
| Peak viscosity after 1 day (cP) | 31,500 | 31,000 | 36,000 |
| Level viscosity after 1 day (cP) | 29,750 | 29,000 | 31,500 |
| Stirred viscosity after 1 day (cP) | 25,750 | 24,500 | 25,250 |
| pH after 1 day | 9.36 | 8.97 | 8.17 |
| Peak viscosity after 4 days (cP) | 31500 | 28,500 | 37,500 |
| Level viscosity after 4 days (cP) | 30000 | 27,750 | 33500 |
| Stirred viscosity after 4 days (cP) | 28500 | 26,000 | 29000 |
| pH after 4 days | 9.51 | 9.06 | 8.28 |
| Peak viscosity after 7 days (cP) | 28500 | 27,000 | 35500 |
| Level viscosity after 7 days (cP) | 27500 | 26,000 | 32000 |
| Stirred viscosity after 7 days (cP) | 27000 | 25,000 | 30500 |
| pH after 7 days | 9.39 | 8.97 | 8.34 |

TABLE 3

Carboxylated Styrene-Butadiene Polymers

| | EXAMPLE | | | | | |
|---|---|---|---|---|---|---|
| | 8 | 9 | 10 | 11 | CE2 | CE3 |
| ROVENE ® 4457 latex | 100 | 100 | 100 | 100 | 100 | 100 |
| Borax | 3 | 3 | 2 | 0.72 | 0 | 0 |
| Class F Fly ash | 350 | 350 | 350 | 350 | 350 | 0 |
| Calcium carbonate | 0 | 0 | 0 | 0 | 0 | 350 |
| CHEMTEX ™ 2017 | 0 | 0.33 | 0 | 0.08 | 0 | 0 |
| SYSTEM 307 | 0 | 0 | 0.7 | 0.34 | 0 | 0 |
| TRITON X-405 | 0 | 0 | 0.35 | 0.08 | 0 | 0 |
| CHEMTEX ™ A-10S | 0 | 0 | 0 | 0.72 | 0 | 0 |
| Boric Acid (OPTIBOR) | 0 | 0 | 0 | 0.05 | 0 | 0 |
| PARAGUM 277 | 0.39 | 0.39 | 0.39 | 0.39 | 0.39 | 0.39 |
| Viscosity after mixing (cP) | 13,400 | 15,600 | 9,000 | 8,000 | 10,000 | 11,300 |
| pH after mixing | 9.09 | 9.11 | 9.05 | 9.02 | 9.6 | 8.03 |
| Temperature after mixing (F.) | 79 | 75 | 78 | 81 | 76 | 79 |
| Total solids (%) | 81.00 | 80.84 | 81.00 | 80.74 | 80.84 | 81.00 |

TABLE 3-continued

Carboxylated Styrene-Butadiene Polymers

| | EXAMPLE | | | | | |
|---|---|---|---|---|---|---|
| | 8 | 9 | 10 | 11 | CE2 | CE3 |
| Peak viscosity after 1 day (cP) | 41500 | 47500 | 29500 | 16500 | >50,000 | 15,500 |
| Level viscosity after 1 day (cP) | 28000 | 30000 | 19000 | 14500 | >50,000 | 13750 |
| Stirred viscosity after 1 day (cP) | 7750 | 7600 | 5900 | 8000 | 9,500 | 10400 |
| pH after 1 day | 9.61 | 9.59 | 9.76 | 9.64 | 10.27 | 8.14 |
| Peak viscosity after 4 days (cP) | 23000 | 23250 | 11250 | 11500 | Set up | 17000 |
| Level viscosity after 4 days (cP) | 20500 | 20000 | 11000 | 11000 | Set up | 15000 |
| Stirred viscosity after 4 days (cP) | 8000 | 7750 | 6250 | 8750 | Set up | 11500 |
| pH after 4 days | 9.48 | 9.43 | 9.59 | 9.56 | Set up | 8.26 |
| Peak viscosity after 7 days (cP) | 19000 | 20000 | 11000 | 12000 | Set up | 18500 |
| Level viscosity after 7 days (cP) | 17500 | 19000 | 10250 | 11500 | Set up | 17000 |
| Stirred viscosity after 7 days (cP) | 8250 | 8750 | 7250 | 10000 | Set up | 13000 |
| pH after 7 days | 9.4 | 9.45 | 9.45 | 9.38 | Set up | 8.53 |

TABLE 4

Styrene-Butadiene Polymers

| | EXAMPLE | | | | | |
|---|---|---|---|---|---|---|
| | 12 | 13 | 14 | 15 | 16 | 17 |
| LXC803F1 | 100 | 100 | 100 | 100 | 100 | 100 |
| Boric Acid (OPTIBOR) | 2 | 2 | 2 | | | |
| Borax | | | | 2 | 2 | 2 |
| AVELON IS | 0.25 | | 0.25 | 0.25 | | 0.25 |
| Class F Fly ash | 400 | 400 | 400 | 400 | 400 | 400 |
| BOSTEX 24 | 0.05 | 0.05 | 0.05 | 0.05 | 0.05 | |
| TRITON X-405 | | 0.175 | 0.175 | | 0.175 | 0.175 |
| SYSTEM 307 | | 0.7 | 0.7 | | 0.7 | 0.7 |
| BIOTERGE AS-40 | 1.2 | 1.2 | 1.2 | 1.2 | 1.2 | 1.2 |
| DURAL P1113 | 1.61 | 1.25 | 1.25 | 2.36 | 1.25 | 1.25 |
| Viscosity after mixing (cP) | 9200 | 9100 | 9400 | 10400 | 11000 | 11800 |
| pH after mixing | 8.71 | 8.58 | 8.63 | 9.24 | 9.26 | 9.22 |
| Temperature after mixing (F.) | 81 | 82 | 84 | 84 | 84 | 77 |
| Total solids (%) | 81.06 | 82 | 82 | 81.06 | 82 | 82 |
| Peak viscosity after 1 day (cP) | 20250 | 16500 | 19750 | 17000 | 18000 | 17500 |
| Level viscosity after 1 day (cP) | 19750 | 14500 | 18250 | 13750 | 14000 | 15000 |
| Stirred viscosity after 1 day (cP) | 9000 | 8300 | 8300 | 9800 | 10100 | 10200 |
| pH after 1 day | 8.94 | 8.83 | 8.94 | 9.62 | 9.59 | 9.58 |
| Peak viscosity after 4 days (cP) | 39500 | 21750 | 19000 | 14000 | 15000 | 16500 |
| Level viscosity after 4 days (cP) | 30500 | 21250 | 17000 | 13250 | 12750 | 13500 |
| Stirred viscosity after 4 days (cP) | 9750 | 9000 | 8500 | 10000 | 10250 | 10500 |
| pH after 4 days | 8.94 | 8.83 | 8.89 | 9.81 | 9.46 | 9.48 |
| Peak viscosity after 7 days (cP) | 30500 | 21500 | 19750 | 16000 | 16000 | 15500 |
| Level viscosity after 7 days (cP) | 25500 | 19250 | 18500 | 14750 | 13500 | 14750 |
| Stirred viscosity after 7 days (cP) | 11000 | 9750 | 9750 | 10750 | 10500 | 11000 |
| pH after 7 days | 9.12 | 8.88 | 8.98 | 9.5 | 9.55 | 9.58 |

That which is claimed:

1. An aqueous dispersion comprising:
   (a) water;
   (b) at least one polymer dispersed in water;
   (c) from about 50 to about 600 parts by weight fly ash per 100 parts by weight dry polymer; and
   (d) a viscosity stabilizing composition comprising at least one borate compound,
   wherein the weight ratio of the at least one borate compound to the fly ash is from about 0.001 to about 0.02.

2. The dispersion as claimed in claim 1, comprising 0.1 to 10 parts by weight of the at least one borate compound per 100 parts by weight dry polymer.

3. The dispersion as claimed in claim 1, comprising about 0.5 to about 3 parts by weight of at least one borate compound per 100 parts by weight dry polymer.

4. The dispersion as claimed in claim 1, wherein the at least one borate compound is selected from the group consisting of borax and boric acid.

5. The dispersion as claimed in claim 4, wherein the at least one borate compound includes borax.

6. The dispersion as claimed in claim 4, wherein the at least one borate compound includes boric acid.

7. The dispersion as claimed in claim 4, wherein the at least one borate compound includes borax and boric acid.

8. The dispersion as claimed in claim 1, wherein the weight ratio of at least one borate compound to fly ash is from about 0.002 to about 0.02.

9. The dispersion as claimed in claim 1, wherein the viscosity stabilizing composition further comprises at least one surfactant.

10. The dispersion as claimed in claim 9, wherein the viscosity stabilizing composition further comprises at least one surfactant selected from the group consisting of alkylphenol polyethoxylates having alkyl groups with 7-18 carbon atoms and 4-100 ethylene oxide units and polyethoxylated fatty alcohols having 12-19 carbon atoms and 4-100 ethylene oxide units.

11. The dispersion as claimed in claim 10, wherein the viscosity stabilizing composition comprises at least one surfactant selected from the group consisting of alkylphenol polyethoxylates having alkyl groups containing 8-13 carbon atoms and having 20-40 ethylene oxide units and polyethoxylated fatty alcohols having 16-18 carbon atoms and 15-50 ethylene oxide units.

12. The dispersion as claimed in claim 10, comprising about 0.3 to about 3.0 parts by weight of the at least one surfactant per 100 parts by weight dry polymer.

13. The dispersion as claimed in claim 1, wherein the at least one polymer dispersed in water includes one or more polymers selected from the group consisting of styrene-butadiene polymers, styrene-acrylic polymers, straight acrylic polymers, vinyl acetate acrylate polymers and vinyl acetate-ethylene polymers.

14. The dispersion as claimed in claim 1, comprising from about 150 to about 400 parts by weight fly ash per 100 parts by weight dry polymer.

15. The dispersion as claimed in claim 1, wherein the stirred viscosity of the aqueous dispersion 7 days after mixing the at least one polymer dispersed in water, fly ash, and the viscosity stabilizing composition is less than 30% greater than the viscosity of the aqueous composition immediately after mixing the at least one polymer dispersed in water, fly ash, and the viscosity stabilizing composition.

16. The dispersion as claimed in claim 15, wherein the stirred viscosity of the aqueous dispersion 7 days after mixing the at least one polymer dispersed in water, fly ash, and the viscosity stabilizing composition is less than 20% greater than the viscosity of the aqueous composition immediately after mixing the at least one polymer dispersed in water, fly ash, and the viscosity stabilizing composition.

17. A fly-ash filled polymer composition, comprising:
(a) 100 parts by weight of at least one polymer dispersed in water,
(b) from about 50 to about 600 parts by weight fly ash, and
(c) from about 0.1 to about 10 parts by weight of at least one borate compound selected from the group consisting of borax and boric acid,
wherein the weight ratio of the at least one borate compound to the fly ash is from about 0.001 to about 0.02.

18. The polymer composition as claimed in claim 17, comprising from about 150 to about 400 parts fly ash.

19. The polymer composition as claimed in claim 17, comprising from about 0.5 to about 3 parts of said at least one borate compound.

20. The polymer composition as claimed in claim 17, further comprising at least one surfactant selected from the group consisting of alkylphenol polyethoxylates having alkyl groups with 7-18 carbon atoms and 4-100 ethylene oxide units and polyethoxylated fatty alcohols having 12-19 carbon atoms and 4-100 ethylene oxide units.

21. The polymer composition as claimed in claim 20, wherein the at least one surfactant is selected from the group consisting of alkylphenol polyethoxylates having alkyl groups containing 8-13 carbon atoms and having 20-40 ethylene oxide units and polyethoxylated fatty alcohols having 16-18 carbon atoms and 15-50 ethylene oxide units.

22. The polymer composition as claimed in claim 20, comprising about 0.3 to about 3.0 parts by weight of the at least one surfactant per 100 parts by weight dry polymer.

23. Carpet backing comprising the polymer composition of claim 17.

24. A fly-ash filled polymer composition, comprising:
(a) 100 parts by weight of at least one polymer dispersed in water,
(b) from about 50 to about 600 parts by weight fly ash, and
(c) from about 0.1 to about 10 parts by weight of at least one borate compound; and
(d) from greater than 0 to about 5 parts by weight of at least one surfactant selected from the group consisting of alkylphenol polyethoxylates having alkyl groups with 7-18 carbon atoms and 4-100 ethylene oxide units and polyethoxylated fatty alcohols having 12-19 carbon atoms and 4-100 ethylene oxide units,
wherein the weight ratio of the at least one borate compound to the fly ash is from about 0.001 to about 0.02.

* * * * *